United States Patent [19]

Hirota et al.

[11] Patent Number: 5,170,363
[45] Date of Patent: Dec. 8, 1992

[54] FUEL GAUGE SYSTEM FOR INDICATING AMOUNT OF MIXED FUEL

[75] Inventors: Toshio Hirota, Yokosuka; Tadaki Oota, Fujisawa, both of Japan

[73] Assignee: Nissan Motor Co., Ltd., Yokohama, Japan

[21] Appl. No.: 592,950

[22] Filed: Oct. 4, 1990

[30] Foreign Application Priority Data

Oct. 9, 1989 [JP] Japan .................................. 1-262248

[51] Int. Cl.$^5$ .............................................. G01F 23/00
[52] U.S. Cl. ................................. 364/550; 364/424.05; 364/509; 364/571.02; 123/1 A; 73/1 H; 73/291
[58] Field of Search ..................... 73/1 H, 149, 61.1 R, 73/290 R, 291; 364/556, 509, 571.01, 571.02, 571.07, 424.01, 424.05, 550, 551.01; 123/1 A

[56] References Cited

U.S. PATENT DOCUMENTS

| | | | |
|---|---|---|---|
| 4,907,451 | 3/1990 | Fleetham | 73/291 |
| 4,967,181 | 10/1990 | Iizuka et al. | 73/290 R X |
| 5,005,402 | 4/1991 | Pischinger et al. | 73/61.1 R |
| 5,033,293 | 7/1991 | Honma et al. | 73/61.1 R X |
| 5,051,921 | 9/1991 | Paglione | 364/509 |

Primary Examiner—Parshotam S. Lall
Assistant Examiner—Edward J. Pipala
Attorney, Agent, or Firm—Lowe, Price, LeBlanc & Becker

[57] ABSTRACT

A fuel gauge system is disclosed, which includes a first device capable of visually indicating the amount of the mixed fuel in the container; a second device for detecting a real amount of the fuel in the container; a third device for detecting the mixing ratio of compositions in the mixed fuel; a fourth device for determining a critical effective amount of the mixed fuel in accordance with the fuel mixing ratio detected by the third device; a fifth device for judging whether the real amount is less than the critical effective amount or not; a sixth device for determining, based on the fuel mixing ratio detected and the real amount, a value corresponding to a calorific power possessed by the mixed fuel in the container; and a seventh device for controlling the first device in such a manner that, when the real amount is less than the critical effective amount, the first device indicates the value corresponding to the calorific power possessed by the mixed fuel in the container, and when the real amount is not less than the critical effective amount and the container is filled with the mixed fuel, the first device indicates the real amount of the mixed fuel by volume.

6 Claims, 4 Drawing Sheets

FUEL GAUGE SYSTEM FOR INDICATING AMOUNT OF MIXED FUEL

BACKGROUND OF THE INVENTION

1. Field of the Invention

The present invention relates in general to fuel gauge systems for measuring the amount of a fuel contained in a container, and more particularly to fuel gauge systems of a type which measures the amount of a mixed fuel, such as a mixture of gasoline and methanol, contained in a fuel tank of a motor vehicle.

2. Description of the Prior Art

In order to clarify the task of the present invention, one conventional fuel gauge system will be outlined with reference to FIG. 5.

In the drawing, designated by numeral 1 is a fuel tank of a motor vehicle, in which a fuel "FX" is contained. A filler cap 8 is detachably connected to a fuel inlet tube of the fuel tank 1. An electric fuel pump 2 is disposed in the fuel tank 1. A fuel supply pipe 3 extends from the pump 2 to a fuel injection valve 5 of an internal combustion engine 4 of the vehicle.

Installed in the fuel tank 1 is a fuel level meter 6 of a float type from which a voltage signal representative of the level of the fuel is fed to a fuel level indicator 7 through a wire (no numeral). Usually, the fuel gauge system is so designed as to make the fuel level indicator 7 point the indicia "EMPTY" when a small amount of fuel is still left in the fuel tank 1. With this, the vehicle can move by a certain distance even after the "EMPTY" indication.

However, the above-mentioned type fuel gauge system suffers the following drawback particularly when it is used for measuring a mixed fuel, such as, a mixture of gasoline and methanol. (Nowadays, for dealing with the air polution problem and energy crisis, such mixed fuel has been proposed and used as the fuel for the motor vehicles.)

That is, as is known to those skilled in the art, due to respective calorific powers possessed by gasoline and methanol, the mileage of the motor vehicle varies considerably depending on the mixing ratio of methanol in the fuel. In fact, the mileage decreases as the mixing ratio of methanol in the fuel increases. This tends to cause an undesired "out of fuel" condition in a motor vehicle when the "EMPTY" indication occurs especially when the vehicle operates on the mixed fuel which contains a large amount of methanol.

In order to solve this drawback, Japanese Utility Model First Provisional Publication No. 62-79113 proposes a measure in which the amount of a mixed fuel is calculated in terms of gasoline. In this measure, the fuel level indicator indicates the calculated amount of the remaining mixed fuel when the same points the indicia "EMPTY".

In this measure, however, a new drawback is encountered. That is, the fuel level indicator can not indicate the amount of the mixed fuel when the fuel tank is filled with the mixed fuel. Thus, it is impossible to recognize the fuel tank being filled with the fuel under fuel feeding of the motor vehicle.

SUMMARY OF THE INVENTION

It is therefore an object of the present invention to provide a fuel gauge system which is free of the above-mentioned drawbacks.

According to the present invention, there is provided a fuel gauge system for indicating the amount of a mixed fuel in a container. The system comprises first means capable of visually indicating the amount of the mixed fuel in the container; second means for detecting a real amount of the fuel in the container; third means for detecting the mixing ratio of compositions in the mixed fuel; fourth means for determining a critical effective amount of the mixed fuel in accordance with the fuel mixing ratio detected by the third means; fifth means for judging whether the real amount is less than the critical effective amount or not; sixth means for determining, based on the fuel mixing ratio detected and the real amount, a value corresponding to a calorific power possessed by the mixed fuel in the container; and seventh means for controlling the first means in such a manner that, when the real amount is less than the critical effective amount, the first means indicates the value corresponding to the calorific power possessed by the mixed fuel in the container, and when the real amount is not less than the critical effective amount and the container is filled with the mixed fuel, the first means indicates the real amount of the mixed fuel by volume.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to FIGS. 1 to 4 of the drawings, there is shown an embodiment of the present invention, which is a fuel gauge system.

Figure 1:
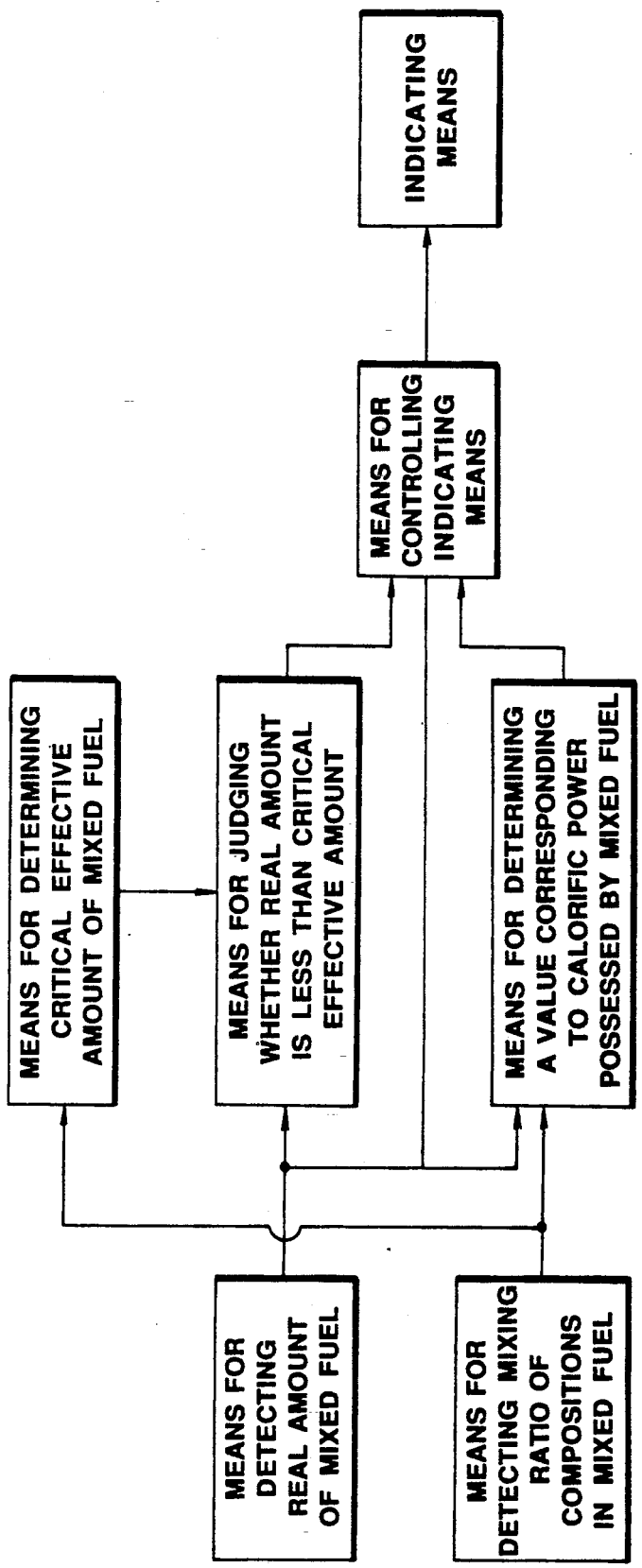
FIG. 1 is a block diagram showing the concept of the present invention.
Figure 2:
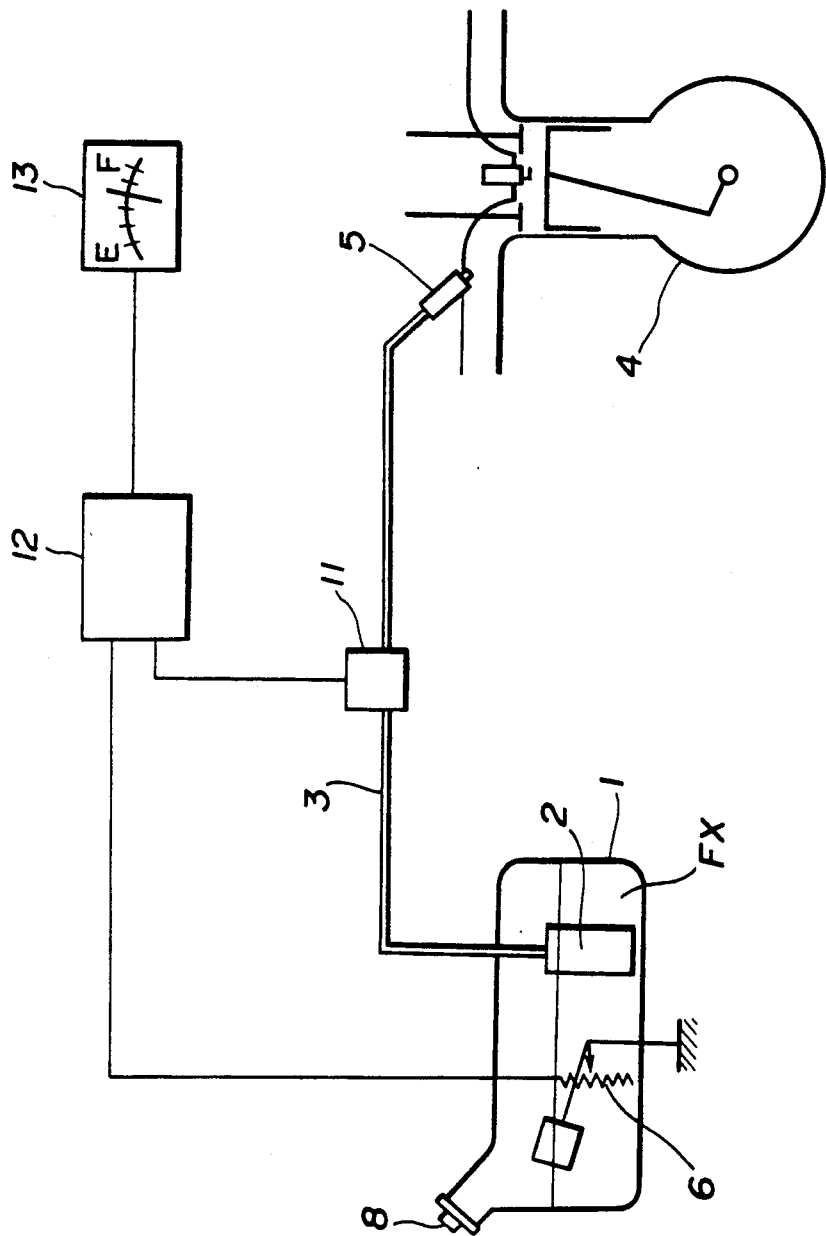
FIG. 2 is a schematic view showing a fuel gauge system of the present invention.

In FIG. 2, designated by numeral 1 is a fuel tank of a motor vehicle, in which a mixed fuel "FX", viz., a mixture of gasoline and methanol, is contained. A filler cap 8 is detachably connected to a fuel inlet tube of the fuel tank 1. An electric fuel pump 2 is disposed in the fuel tank 1. A fuel supply pipe 3 extends from the fuel pump 2 to a fuel injection valve 5 of an internal combustion engine 4 of the motor vehicle.

Installed in the fuel tank 1 is a fuel level meter 6 of a float type.

Connected to the fuel supply pipe 3 is an alcohol sensor 11 which detects a methanol concentration in the mixed fuel "FX". An information signal from the alcohol sensor 11 is fed to a control unit 12 which has a microcomputer installed therein.

A voltage signal from the fuel level meter 6 is also fed to the control unit 12.

Designated by numeral 13 is a fuel level indicator which is controlled by the control unit 12. As shown, the fuel level indicator 13 has indicia "F" (full) and "E" (empty).

Figure 3:
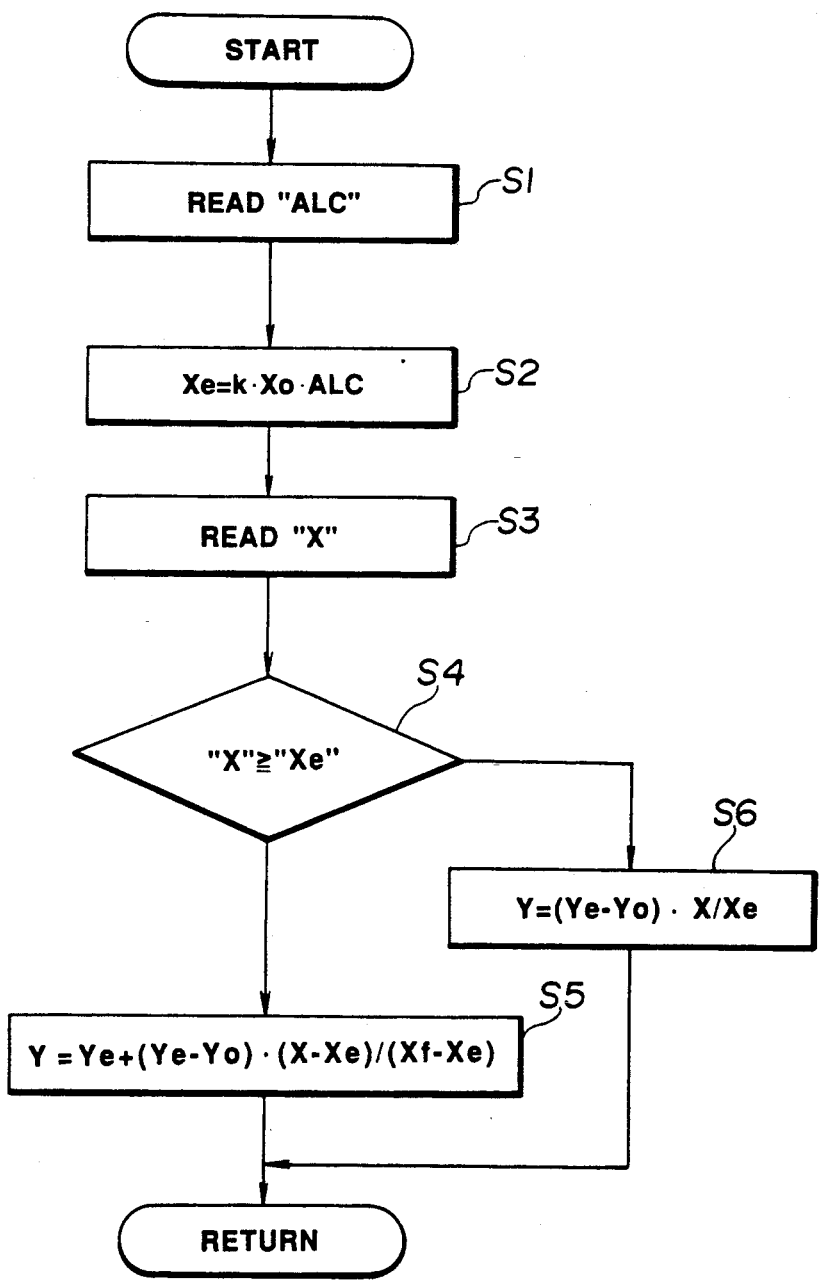
FIG. 3 is a flowchart showing programmed operation steps carried out in a computer used in the present invention.

The microcomputer in the control unit 12 operates in a manner as is depicted by the flowchart of FIG. 3.

In the following, the programmed operation carried out by the control unit 12 will be described with reference to FIG. 3.

At step S1, based on the information signal from the alcohol sensor 11, a methanol concentration "ALC" is read. Although not shown in FIG. 2, an analog-to-digital converter is installed in the control unit 12 to treat an analog-type information signal from the alcohol sensor 11. When, at this step (S1), the fuel is all gasoline, "1" is read, and when the fuel contains 85 vol % methanol (that is, M85), "1.75" is read. Thus, when the fuel contains methanol by an amount ranging from 0 to 85 vol %, a suitable numeral (that is, from 1 to 1.75) calculated by using the interpolation method is read. These numerals to be read are obtained from an experimental fact in that the mileage of a motor vehicle operating on the M85 fuel is 1/1.75 of that operating on only gasoline.

At step S2, based on the methanol concentration "ALC" thus read, a so-called "critical effective amount "Xe" of the mixed fuel is calculated from the following equation (1), which represents a percent value corresponding to the volume percentage of the fuel relative to the effective capacity of the fuel tank 1 at the time when the fuel level indicator 13 should point the indicia "EMPTY" (that is, "Ye").

$$Xe\ (\%) = k \cdot Xo \cdot ALC \tag{1}$$

wherein:
- k: constant,
- Xo: critical effective amount (%) of a fuel when the fuel is all gasoline.

Figure 4:
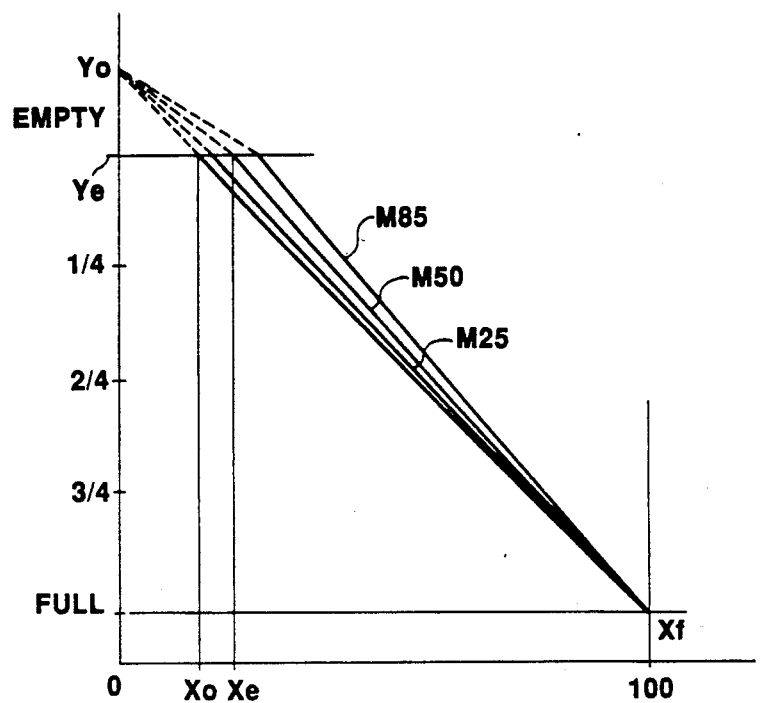
FIG. 4 is a graph for explaining the present invention.
Figure 5:
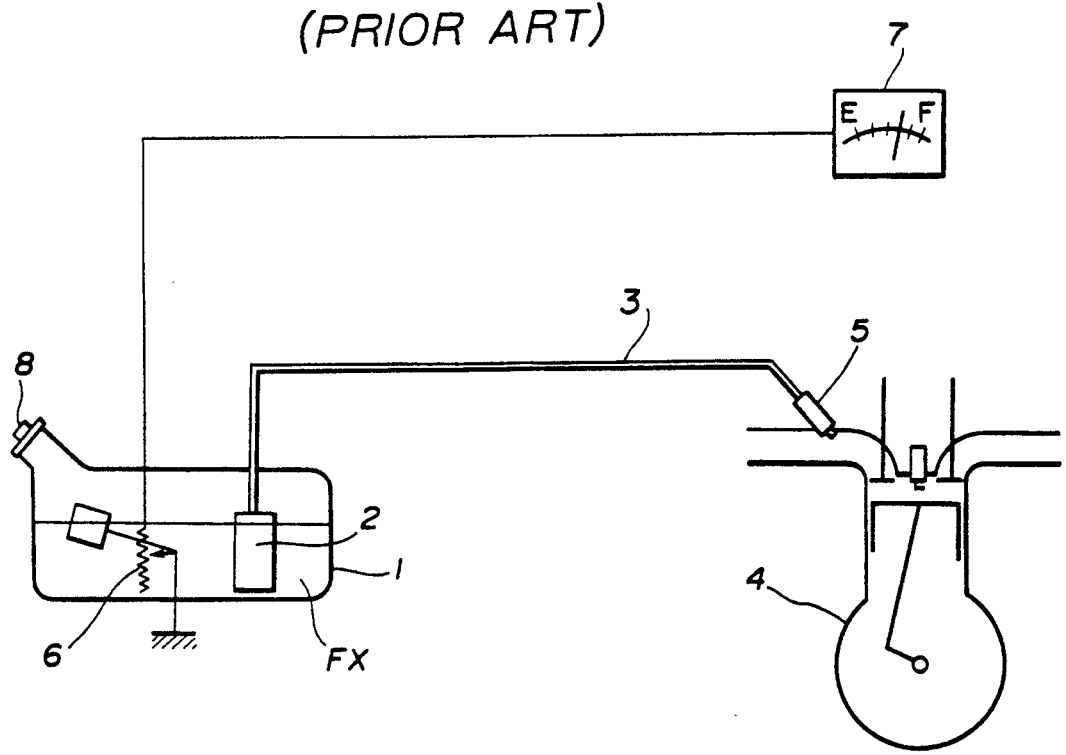
FIG. 5 is a view similar to FIG. 2, but showing a conventional fuel gauge system.

As is understood from the equation (1) and FIG. 4, the critical effective amount "Xe" of a mixed fuel increases as the methanol concentration "ALC" increases.

That is, when the critical effective amount "Xo" is determined 15%, the critical effective amount "Xe" of the M85 fuel (which contains 85 vol % methanol) becomes about 26%. This will be well understood from the equation (1) and the graph of FIG. 4.

At step S3, based on the information signal from the fuel level meter 6, the real amount "X" of the remaining mixed fuel in the fuel tank 1 is read. The real amount "X" represents the amount of the remaining fuel in terms of volume percentage relative to the effective volume of the tank 1.

At step S4, a judgment is carried out as to whether the real amount "X" is greater than or equal to the critical effective amount "Xe" or not. If Yes, that is, when "X" $\geq$ "Xe" is established, the operation step goes to step S5, and if No, that is, "X" < "Xe" is established, the operation step goes to step S6.

At step S5, a fuel amount indicating value "Y" is calculated from the following equation (2).

$$Y = Ye + (Yf - Ye) \cdot (X - Xe)/(Xf - Xe) \tag{2}$$

wherein:
- Yo: fuel amount indicating value at the time when the amount of the mixed fuel in the fuel tank is almost zero,
- Xf: real remaining amount of the mixed fuel when the fuel tank is filled with the mixed fuel ("FULL" indication).

The equation (2) represents the relation depicted by the solid lines in the graph of FIG. 4.

Thus, as is seen from the solid lines of the graph, when the real remaining amount "X" of the mixed fuel is 100% (viz., "Xf":FULL), the indicia "FULL" is always indicated irrespective of the methanol concentration when the fuel tank is filled with a mixed fuel.

When the real remaining amount "X" is less than 100% (viz., "Xf"), the fuel amount indicating value "Y" decreases as the methanol concentration increases.

At step S6, the fuel amount indicating value "Y" is calculated from the following equation (3).

$$Y = (Ye - Yo) \cdot X/Xe + Yo \tag{3}$$

The equation (3) represents the relation depicted by the broken lines in the graph of FIG. 4.

Thus, as is seen from the broken lines of the graph, when the real remaining amount "X" is less than "Xe", the indicia "EMPTY" is always indicated irrespective of the methanol concentration of the mixed fuel, and the fuel amount indicating value "Y" decreases as the methanol concentration increases. When the real remaining amount "X" is zero, the value "Yo" is established. Since, as is described hereinabove, the critical effective amount "Xe" corresponding to the fuel amount indicating value "Y" increases with increase of the methanol concentration in the mixed fuel, the value "Ye" is representative of the calorific power (energy) possessed by the remaining fuel in the fuel tank.

As is understood from the foregoing description, in the present invention, the "EMPTY" indication is so made as to indicate a value corresponding the calorific power (energy) possessed by the mixed fuel remained in the fuel tank. Thus, after the "EMPTY" indication, the motor vehicle can move by a substantial distance irrespective of the methanol concentration in the mixed fuel. This prevents the undesired "out of fuel" condition of the vehicle upon driving with the fuel level indicator indicating "EMPTY".

Furthermore, when, in the present invention, the fuel tank is filled with the fuel, the "FULL" indicia is assuredly indicated by the fuel level indicator irrespective of the methanol concentration of the mixed fuel. Thus, full feeding of the fuel to the fuel tank is recognized.

Although the above description is directed to a case wherein a mixture of gasoline and methanol is used, the present invention is also applicable to another case wherein a mixture of gasoline and ethanol is used. When, in this case, the fuel contains 85 vol & ethanol, the ethanol concentration value "ALC'" is determined 1.45.

Furthermore, the present invention is applicable to a case wherein a mixture of gasoline, methanol and ethanol is used.

In this case, the critical effective amount "Xe" is calculated from the following equation (4), $$Xe\ (\%) = Kl \cdot Xo \cdot ALC' \tag{4}$$

wherein:
- kl: constant,

The value "ALC'" is calcuated from the following equation (5), $$\begin{aligned} ALC &= 7650/((1 - C1 - C2) \times 7650 \\ &\quad + C1 \times 3790 + C2 \times 5060) \\ &= 1/(1 - C1 - C2 + 0.495 \times C1 + 0.661 \times C2) \end{aligned}$$

wherein
7650: calorific power (Kcal/l) of gasoline,
3790: calorific power (Kcal/l) of methanol,
5060: calorific power (Kcal/l) of ethanol,
C1: methanol concentration,
C2: ethanol concentration.

What is claimed is:

1. A fuel gauge system for indicating the amount of a mixed fuel in a container, including a microprocessor, fluid level sensor, second sensor for detecting a second type of fuel in said mixed fuel and first means capable of visually indicating the amount of said mixed fuel in said container, said microprocessor comprising:
   second means for determining a real amount of the fuel in the container, said second means being connected to said fluid level sensor;
   third means for detecting the mixing ratio of compositions in said mixed fuel, said third means being connected to said second sensor;
   fourth means for determining a critical effective amount of the mixed fuel in accordance with the fuel mixing ratio detected by said third means;
   fifth means for judging whether said real amount is less than said critical effective amount or not;
   sixth means for determining, based on the fuel mixing ratio detected and said real amount, a value corresponding to a calorific power possessed by said mixed fuel in said container; and
   seventh means for controlling said first means in such a manner that, when said real amount is less than said critical effect amount, said first means indicates said value corresponding to said calorific power possessed by said mixed fuel in said container, and when said real amount is not less than said critical effective amount and said container is filled with said mixed fuel, said first means indicates the real amount of the mixed fuel by volume.

2. A fuel gauge system as claimed in claim 1, in which said mixed fuel is a mixture of gasoline and alcohol.

3. A fuel gauge system as claimed in claim 2, in which said real amount detected by said second means is represented by a volume percent of said mixed fuel relative to the effective capacity of said container.

4. A fuel gauge system as claimed in claim 3, in which said critical effective amount determined by said fourth means represents a percent value corresponding to the volume percentage of the mixed fuel relative to the effective capacity of the container at the time when a pointer of said first means points the indicia "EMPTY".

5. A fuel gauge system as claimed in claim 4, in which said critical effective amount "Xe" is calculated from the following equation:

$$Xe = k \cdot Xo \cdot ALC$$

wherein:
   k: constant,
   Xo: critical effective amount of a fuel when the fuel is all gasoline,
   ALC: concentration of alcohol in a mixed fuel.

6. A fuel gauge system as claimed in claim 5, in which said value corresponding to said calorific power possessed by said mixed fuel in said container is calculated from the following equation:

$$Y = (Ye - Yo) \cdot X/Xe + Yo$$

wherein:
   Ye: indicating value of said first means at the time when the real amount is equal to the critical effective amount,
   Yo: indicating value of said first means at the time when the real amount is almost zero,
   x: real amount of the mixed fuel in the container, and
   Xe: critical effective amount.

* * * * *